United States Patent
Condon et al.

(10) Patent No.: US 7,177,441 B2
(45) Date of Patent: Feb. 13, 2007

(54) SYSTEM AND METHOD FOR SECRET COMMUNICATION

(75) Inventors: John B. Condon, Berthoud, CO (US); Joan LaVerne Mitchell, Longmont, CO (US); Nenad Rijavec, Longmont, CO (US); Timothy James Trenary, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/314,668

(22) Filed: Dec. 9, 2002

(65) Prior Publication Data

US 2004/0109583 A1    Jun. 10, 2004

(51) Int. Cl.
*G06K 9/00* (2006.01)
*G06K 9/36* (2006.01)

(52) U.S. Cl. .................... 382/100; 382/232; 382/246
(58) Field of Classification Search .................... None
See application file for complete search history.

(56) References Cited

U.S. PATENT DOCUMENTS

| | | | | |
|---|---|---|---|---|
| 6,229,924 | B1* | 5/2001 | Rhoads et al. | 382/232 |
| 6,580,809 | B2* | 6/2003 | Stach et al. | 382/100 |
| 6,647,130 | B2* | 11/2003 | Rhoads | 382/100 |
| 6,678,389 | B1* | 1/2004 | Sun et al. | 382/100 |
| 6,801,636 | B2* | 10/2004 | Murakami et al. | 382/100 |
| 6,965,682 | B1* | 11/2005 | Davis et al. | 382/100 |
| 2001/0026616 | A1* | 10/2001 | Tanaka | 380/202 |
| 2001/0028725 | A1* | 10/2001 | Nakagawa et al. | 382/100 |
| 2001/0044899 | A1* | 11/2001 | Levy | 713/176 |
| 2002/0001395 | A1* | 1/2002 | Davis et al. | 382/100 |
| 2002/0129253 | A1* | 9/2002 | Langelaar | 713/176 |

(Continued)

OTHER PUBLICATIONS

Rowland et. al. "Covert Channels in the TCP/IP Protocol Suite" http://www.firstmonday.org/issues/issue2_5/rowland/.*
Ahsan et al. "Pratical Data Hiding in TCP/IP" Workshop Multimedia and Security at ACM Multimedia '02, Dec. 6, 2002.*

*Primary Examiner*—Bhavesh M. Mehta
*Assistant Examiner*—Utpal Shah
(74) *Attorney, Agent, or Firm*—Thomas A. Beck; Lisa M. Yamonaco

(57) ABSTRACT

We present a communication system which enables two or more parties to secretly communicate through an existing digital channel which has a primary function other than this secret communication. A first party receives a series of cover data sets, hides a certain amount of auxiliary data in the cover data sets, and then relays these cover data sets containing hidden data to a second party, aware of the hidden data. This second party may then extract the hidden data and either restore it to its original state (the state it was in before the first party received it) and send it along to its original intended destination, or may just simply extract the hidden auxiliary data. There exist a plethora of techniques for hiding auxiliary data in cover data, and any of these can be used for the hiding phase of the system. For example, in a JPEG cover data set, a Huffman table may be modified in such a way as to have no impact on the observable nature of the image, and several such schemes are presented here. Since there are so many ways in which to exploit a particular cover data set for secret communication, it is necessary that the first and second parties have pre-established a set of rules by which they will communicate. There must be agreement on the hiding technique, cover data type and location of the hidden data within the cover.

9 Claims, 4 Drawing Sheets

U.S. PATENT DOCUMENTS

2003/0016756 A1* 1/2003 Steenhof et al. ....... 375/240.25
2003/0202707 A1* 10/2003 Thyagarajan et al. ....... 382/239
2005/0036653 A1* 2/2005 Brundage et al. ........... 382/100
2005/0232498 A1* 10/2005 Osborne et al. ............ 382/232

* cited by examiner

SYSTEM AND METHOD FOR SECRET COMMUNICATION

BACKGROUND OF THE INVENTION

1. Field of the Invention

The present invention relates to a system and a method for conducting secret communication through a preexisting digital communication channel (network).

2. Description of the Related Art

Privacy and encrypted communications over the Internet are gaining more and more prominence. Some governments (Great Britain and Russia are current examples) either forbid private citizens from using encryption or require that the keys to the encrypted messages be handed on demand to government agencies.

Steganography is the practice of disguising the existence of a particular message. In modern usage, this generally implies that some information of interest (auxiliary data) will be hidden in, what is known to those skilled in the art, as cover data. Commonly used cover data includes images, audio files and e-mail. Although the term "steganography" is most often used to describe the class of schemes by which auxiliary data is hidden in cover data, it has a broader connotation by which it also envelopes systems which enable secret communication to take place.

When secret communication between two or more individuals occurs, there is inevitably an encryption which takes place. This encryption can be as simple as an agreed upon hand signal for secret communication in public, or as complex as the most sophisticated digital steganographic techniques. However, no system of encryption is unbreakable, and once detected it can compromise not only the particular message that was detected, but the identities of the parties involved in the secret communication. As personal privacy on the Internet and in digital communication continues to be challenged, there is a need in the art to provide an improved system and method of secret communication in a digital network.

1Several broad-based disclosures, i.e., "*Digital Steganography*" by Donovan Artz and "Invisible Communication" by Tuomas Aura have addressed aspects the field of steganography. These treatises cover the field in general terms and have no impact on the novelty and non-obviousness of the present invention.

For example, the "*Digital Steganography*" article by Artz is a survey of commonly used data hiding techniques. It mentions in general terms that unused header segments of a data file would seem to be excellent places to hide data. Thus, based upon this disclosure, the skilled artisan would deduce techniques for hiding data in data header structures, such as comment fields and unused segments. Artz also discloses a number of techniques which involve hiding data in structures by permuting particular table entries or header segments using a predetermined mapping of the possible permutations to a pre established code alphabet.

Artz seems to imply the concept of "trickling" the data out in small pieces into a high-volume stream of cover data sets in an attempt to avoid the suspicion that a large amount of hidden data in a single cover set might cause.

The article by Aura also discusses using the header of a data file as the carrier of hiding data.

Another disclosure relating to this field is entitled "*A Scheme of Secret Communication Using Internet Control Message Protocol*" by Masataka Suzuki and Tsutomu Matsumoto, found in IEICE Trans. Fundamentals, Vol. E85A, No. 1, January 2002. This article details a method by which an existing network can be used to conduct secret communication by forcing errors into network traffic in such a way that the returned error message effectively contains the secret communication.

The Suzuki/Matsumoto method noted above is substantially different from the very special scheme of interception embodied in the present invention which allows for normal, error-free operations to continue while secret communication goes on. Contrary to the method disclosed above, by which an existing network can be used to conduct secret communication by forcing errors into network traffic in such a way that the returned error message effectively contains the secret communication, the present invention, as is explained in greater detail hereinafter, utilizes direct interception of network traffic as a main communication method which can be augmented by additional steganographic techniques, for example a Huffman table hiding method.

It is hereby emphasized the method of the present invention explicitly involves exploitation of "unused" Huffman codes in any way deemed appropriate. There is no explicit mention in any of the prior art articles cited above of any structure remotely similar to unused Huffman codes.

SUMMARY OF THE INVENTION

The present invention relates to a communication system which enables two or more parties to secretly communicate through an existing digital channel. The digital channel noted has a primary function other than the aforementioned secret communication.

In accordance with the present invention, a first party receives a series of cover data sets. This first party then hides a certain amount of auxiliary data in the cover data sets, and then relays these cover data sets, containing hidden data, to a second party, who is aware of the hidden data. This second party recipient may then extract the hidden data and either restore the hidden data to its original state (the state it was in before the first party received it) and send it along to its original intended destination, or may just simply extract the hidden auxiliary data.

The present invention relates to a method for hiding data, a system of implementing the transmission between sender and recipient, and a program for secret communication between two parties using an existing network channel.

As noted above, digital cover data is received and said data is hidden in the cover data by a first party interceptor using at least one hiding scheme. This first interceptor allows the cover data containing said hidden data to continue in its original route whereby a second party receives the digital cover with hidden data and extracts said hidden data. The second party allows the cover data to continue on in its original route.

In a further aspect of the invention, the cover data mentioned above consists of JPEG images; and the hiding scheme embodied in the system consists of modifying the custom Huffman tables of the JPEG images.

There exists a plethora of techniques for hiding auxiliary data in cover data, and any of these can be used for the hiding phase of the system. For example, as noted above, in a JPEG cover data set, a custom Huffman table may be modified in such a way as to have no impact on the observable nature of the image, and several such schemes are presented as a part of this invention.

Since there are so many ways in which to exploit a particular cover data set for secret communication, it is necessary that the first and second parties have pre-established a set of rules by which they will communicate. There must be agreement on the hiding technique, cover data type and location of the hidden data within the cover.

With respect to the operation of the system of the present invention, anytime the encoder describes a particular custom Huffman table to the receiver, the Huffman code words of equal length can be swapped to provide secret information without changing the coded file size. If the convention is to normally order the codes of a given length, it is easy for the receiver to restore the original custom Huffman table order and restore the compressed data to its original state. Alternatively, some of the secret information can consist of how to restore the table.

BRIEF DESCRIPTION OF THE DRAWINGS

The present invention will be more fully understood by reference to the following detailed description of the preferred embodiments of the present invention when read in conjunction with the accompnaying drawings, in which like reference characters refer to like parts throughout the views and in which.

DETAILED DESCRIPTION OF THE PREFERRED EMBODIMENT

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
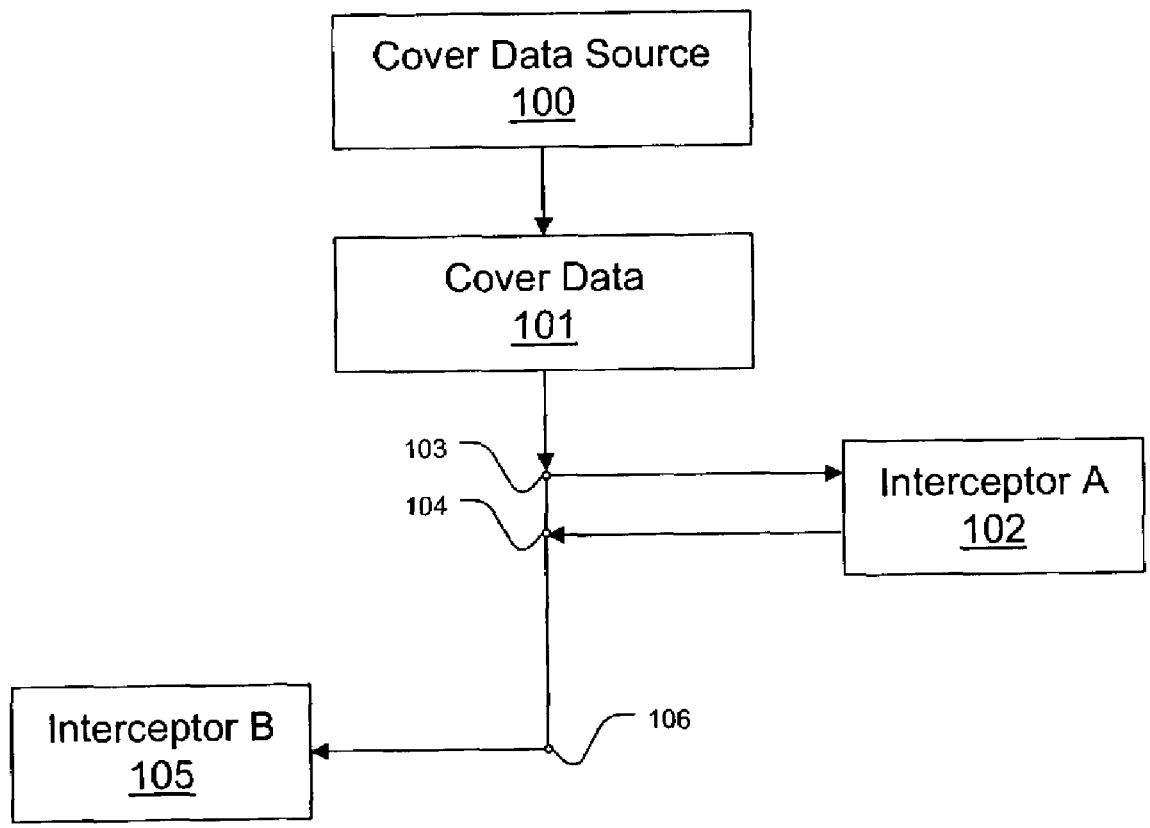
FIG. 1 illustrates the basic secret communication system.

FIG. 1 illustrates the essential components included in the secret communication system of the present invention. Digital cover data 101 is enroute from source 100, and is intercepted by interceptor A at node 103. Source 100 can represent any type of originator of cover data. Interceptor A hides data in cover data 101, in block 102 before returning cover data 101 to its original course at node 104. At node 104 cover data 101 is intercepted by Interceptor B at node 106, and all, or some of the hidden data put in cover data 101 by Interceptor A is extracted in block 105. This hidden data is not returned to its original course. Extraction can involve actual removal of the hidden data from the cover, thereby restoring it to its original state, or simply observing the hidden data, leaving it hidden in the cover.

By way of illustration, as an example of this system, consider two network administrators in cooperating companies who wish to conduct secret communication unbeknownst to their respective employers. Assuming that one network administrator (Interceptor A) in this example has hidden some data in the cover of selected outgoing network transmissions, the other administrator (Interceptor B) could have a private sniffer set up on incoming network traffic which looks for a pre-agreed upon flag, be it a particular image type or e-mail from or to some particular individual. Being aware of the hiding scheme, the receiving administrator subsequently extracts the hidden data from the cover data.

There are times when the system ends at this stage. If, for example, the cover data has been chosen to be outgoing spam, then Interceptor B can most likely extract whatever hidden content there is and discard the cover. However, there may be times when it is wiser to allow the cover data to continue on its original route after the extraction of hidden data by Interceptor B.

Figure 2:
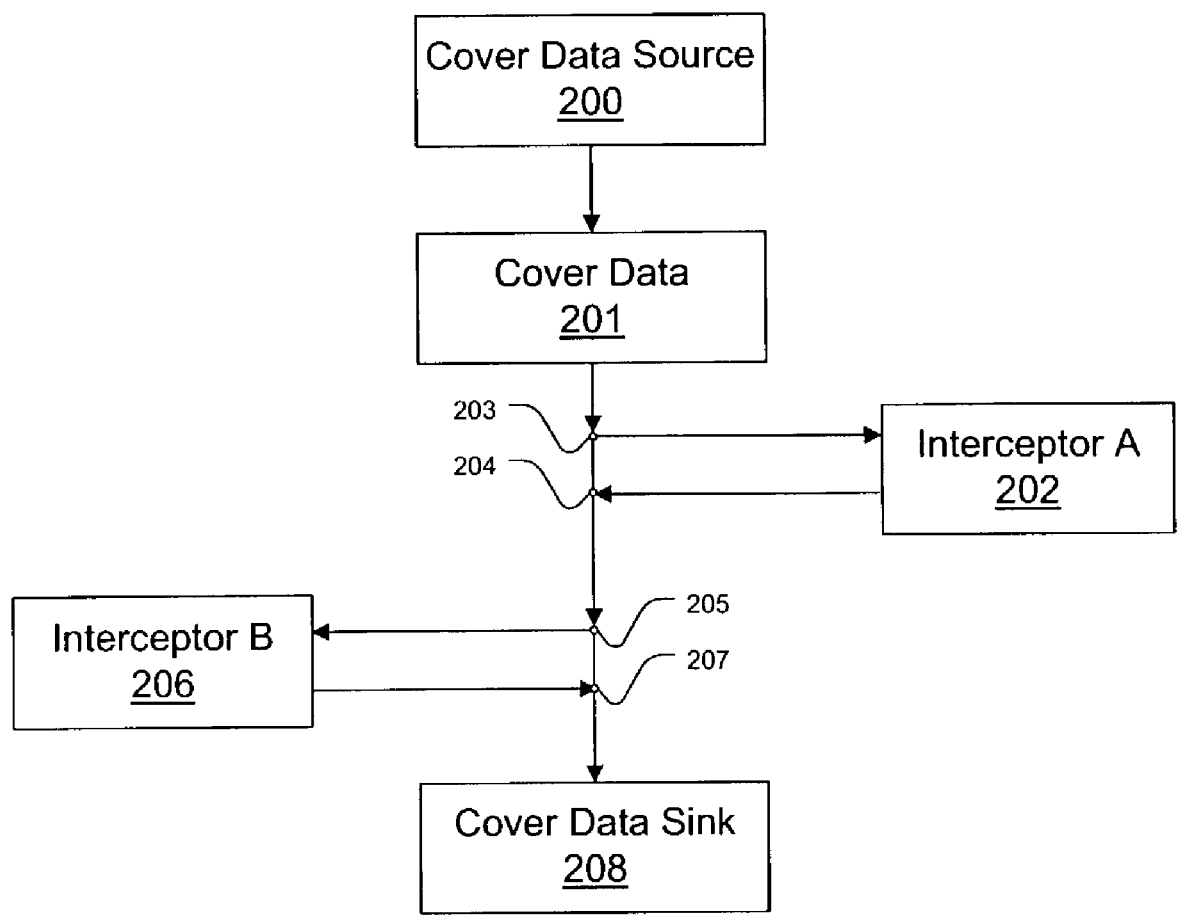
FIG. 2 illustrates an enhanced version of the basic secret communication scheme.

This situation is demonstrated in FIG. 2 where digital cover data 201, enroute from a source 200 is intercepted by Interceptor A at node 203. In block 202, Interceptor A hides data in the cover data 201 and then returns the cover data 201 to its original course at node 204, whereby it is intercepted by Interceptor B at node 205 and all or some of the hidden data put in the cover data 201 by Interceptor A is extracted in 206. At this point in the operating sequence, as has been noted above, the extraction by Interceptor A may consist of actual removal of the hidden data or simply observing it, the cover data is returned at node 207 to its original trajectory towards cover data sink 208, which represents any possible end destination.

The instant invention also embodies several specific hiding scheme implementations aimed at utilizing the Huffman tables of JPEG compressed data. Many other implementations are possible and the instant invention is directed only to those that implement hiding data in the Huffman table of a compressed image. The JPEG standard is described in *JPEG Still Image Data Compression Standard* by Pennebaker and Mitchell, published by Van Nostrand Reinhold, 1993, the contents of which are hereby fully incorporated by reference herein. The various specific implementations detailed below refer to the compression methods used to produce JPEG data.

The following implementations of hiding methods exploit the Huffman table information in a compressed image which is compressed with a data compression scheme that allows custom Huffman tables.

Figure 3:
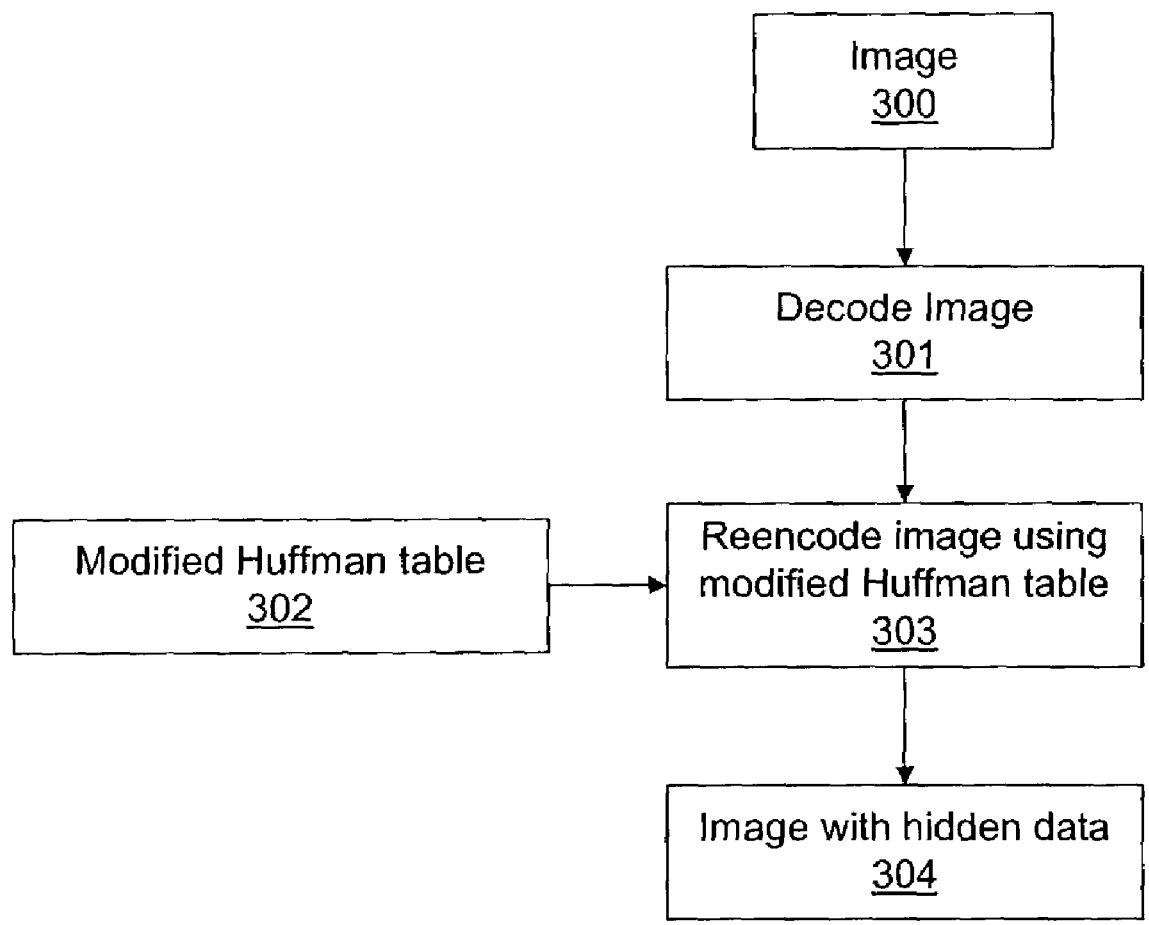
FIG. 3 illustrates a system for utilizing custom Huffman code structures for hiding data.

Referring to FIG. 3, a generalized hiding scheme is described that utilizes the Huffman code control information in a compressed image. Here, an image is received in block 300 and is decoded in 301. A modified Huffman table 302 is used in 303 to re-encode the image. This Huffman table 302 is modified in such a way that the difference between it and the original Huffman table conveys the hidden data. This modification can be as simple as a permutation scheme which permutes all codes of the same length, or a deeper statistical alteration of the codes. An important consideration in the modification is that the change should leave the observable nature of the original image intact. The "samelength code" permutation scheme mentioned above would produce no change in the appearance of the image.

Such methods of hiding data in a Huffman table as described above, will almost always require that a decode/re-encode sequence be performed, which in large volume processing can hinder performance.

The present invention provides a method by which data can be hidden in the Huffman table of a JPEG image. It is assumed for the sake of exposition of this invention, that the image is simply a grayscale baseline JPEG image, but that same scheme could easily be extended and implemented in for example, a color JPEG image. Furthermore, this scheme can be implemented in any compression format which utilizes quantization and Huffman tables in a way similar to that of the JPEG standard.

Figure 4:
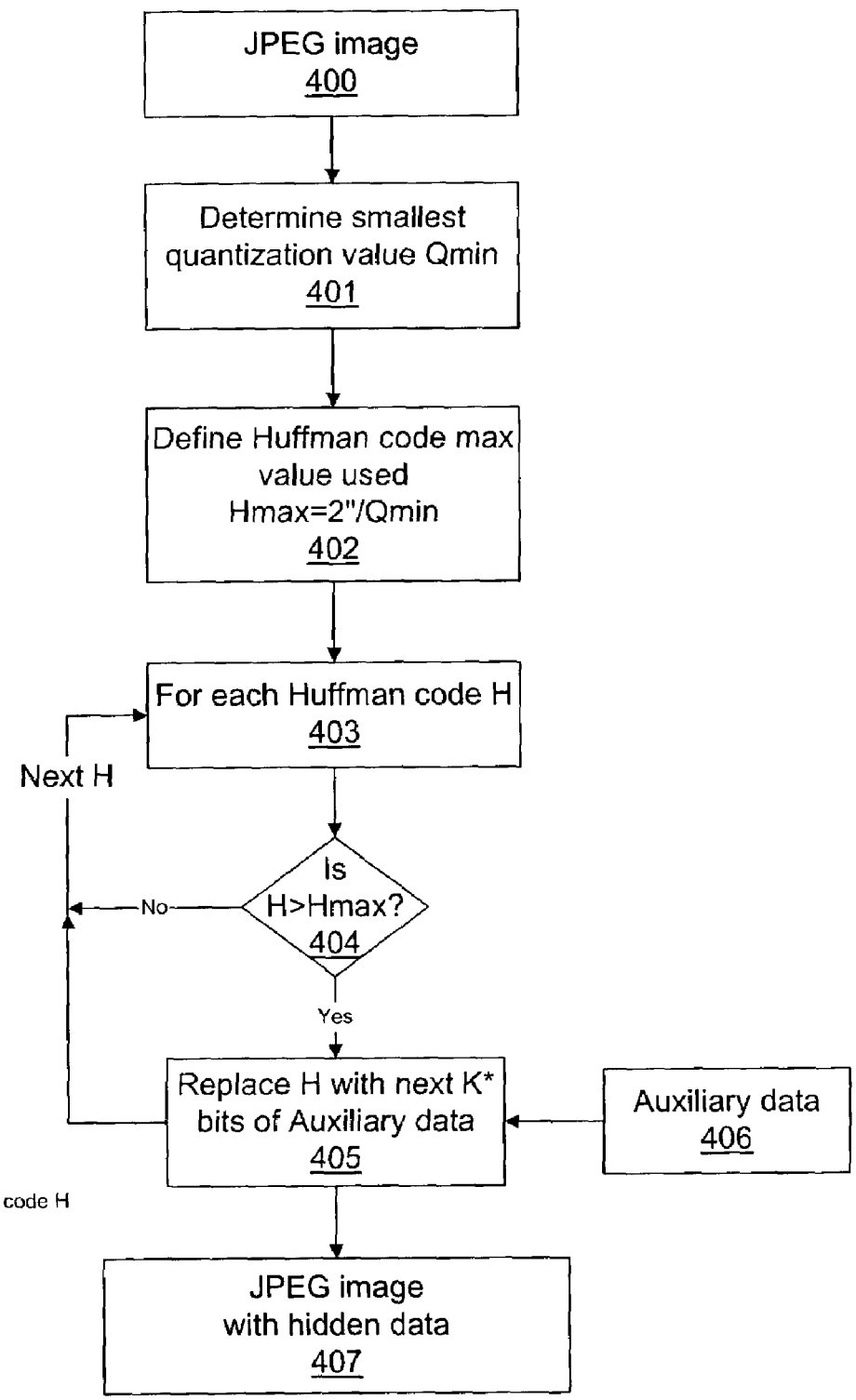
FIG. 4 illustrates a specific method for hiding data in Huffman code structures.

Referring to FIG. 4, a JPEG image 400 is received, an appropriate quantization table is located and the smallest quantization value $Q_{min}$ is determined in 401. The value $H_{max}$, representing the largest Huffman code required to encode the image, is then determined in 402 by dividing $2^{11}$ by $Q_{min}$, from 401. In 403 loops over each Huffman code H in the image commence. In 404 a test is initiated to see if this H value from 403 exceeds $H_{max}$ value from 402. If not, then loop back to 403 to get the next Huffman code H from the file. If the condition of 404 is satisfied, then in 405 replace this H value of length k bits with the next k bits of auxiliary data taken from 406 and consider the next H value. Once the loop terminates, the JPEG image now contains hidden data. In addition to the advantage of avoiding the decode/re-encode sequence, this method has the advantage of easily allowing for any data to be hidden in the image without deep technical understanding of Huffman table construction.

It is understood with respect to the discussion of the figures, that the "image" referred to is in fact a "compressed image," since images by themselves do not have custom Huffman tables, but compressed images do.

Thus while there have been shown and described and pointed out fundamental novel features of the invention as applied to currently preferred embodiments thereof, it will be understood that various omissions, substitutions and changes in the form and details as to the communication system of the present invention and methods encompassed therewith, may be made by those skilled in the art without departing from the spirit of the invention. In addition, it is to be understood that the drawings are provided for informational purposes. It is the intention therefore to be limited only as indicated by the scope of the claims appended herewith.

The invention claimed is:

1. A method for conducting secret communication through a pre-existing digital communication channel comprising:
   receiving digital cover data, said digital cover data being compressed image data and containing header and content data by a first party interceptor using at least one hiding scheme, said hiding scheme comprising decoding JPEG cover data sets and then re-coding with custom Huffman tables that have been modified so that the deviation of a table from a pre-established reference custom Huffman table constitutes the hiding of arbitrary data, said first interceptor allowing said cover data containing said header and content data in its respective header data to continue in its original route,
   whereby a second party receives said digital cover data with said header and content data in said header data and extracts said hidden data from said header data.

2. The method defined in claim 1 wherein said second party allows said cover data to continue on its original route.

3. The method defined in claim 1 wherein said compressed image data is at least one JPEG data set.

4. The method of claim 1 wherein at least one hiding scheme comprises:
   decoding said at least one JPEG data set and then re-coding with custom Huffman tables created by permuting the Huffman symbols for each number of bits/code according to a pre-established permutation scheme.

5. The method of claim 1 wherein at least one hiding scheme comprises modifying unused Huffman codes.

6. A system for conducting secret communication through a pre-existing digital communication channel comprising:
   receipt of digital cover data said digital cover data being arbitrary network communication and containing header and content data by a first party interceptor having used at least one hiding scheme, said hiding scheme comprising decoding JPEG cover data sets and then re-coding wit custom Huffman tables that have been modified so that the deviation of a table from a pre-established reference custom Huffman table constitutes the hiding of arbitrary data;
   said first interceptor having allowed said cover data containing said header and content data in its respective header data to continue in its original route
   whereby a second party receives said digital cover data with said header and content data in said header data and extracts said hidden data from said header data.

7. The system defined in claim 6 wherein said second party allows said cover data to continue towards its intended destination.

8. The system defined in claim 6 wherein said at least one hiding scheme comprises:
   decoding said at least one JPEG data set and then re-coding with custom Huffman tables created by permuting the Huffman symbols for each number of bits/code according to a pre-established permutation scheme.

9. The system of claim 6 wherein at least one hiding scheme comprises: modifying unused Huffman codes.

* * * * *